US012603453B2

(12) United States Patent
Morita

(10) Patent No.: US 12,603,453 B2
(45) Date of Patent: Apr. 14, 2026

(54) ELECTRICAL CONNECTOR AND ELECTRICAL CONNECTOR SET HAVING THE ELECTRICAL CONNECTOR

(71) Applicant: Murata Manufacturing Co., Ltd., Kyoto-fu (JP)

(72) Inventor: Yuuto Morita, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 298 days.

(21) Appl. No.: 18/456,689

(22) Filed: Aug. 28, 2023

(65) Prior Publication Data

US 2023/0402781 A1 Dec. 14, 2023

Related U.S. Application Data

(63) Continuation of application No. PCT/JP2022/006622, filed on Feb. 18, 2022.

(30) Foreign Application Priority Data

Mar. 4, 2021 (JP) ................................. 2021-034291

(51) Int. Cl.
*H01R 13/42* (2006.01)
*H01R 13/6597* (2011.01)
*H01R 12/71* (2011.01)

(52) U.S. Cl.
CPC ......... *H01R 13/42* (2013.01); *H01R 13/6597* (2013.01); *H01R 12/716* (2013.01)

(58) Field of Classification Search
CPC .. H01R 13/42; H01R 13/6597; H01R 12/716; H01R 12/73; H01R 13/6582
See application file for complete search history.

(56) References Cited

U.S. PATENT DOCUMENTS 10,804,647 B2 * 10/2020 Kitagawa ............. H01R 13/629
2018/0358729 A1 * 12/2018 Chen .................. H01R 12/7088
(Continued)

FOREIGN PATENT DOCUMENTS

JP 6418324 B2 11/2018
JP 2019-197719 A 11/2019
(Continued)

OTHER PUBLICATIONS

International Search Report issued in PCT/JP2022/006622; mailed Apr. 26, 2022.

*Primary Examiner* — Abdullah A Riyami
*Assistant Examiner* — Nader J Alhawamdeh
(74) *Attorney, Agent, or Firm* — Studebaker Brackett PLLC

(57) ABSTRACT

An electrical connector that effectively suppresses unnecessary radiation noise and an electrical connector set having the electrical connector. The electrical connector includes internal terminals, an insulating member that holds the internal terminals, and an external terminal that surrounds the internal terminals. The external terminal includes peripheral edge portions that cover a frame portion of the insulating member, and a contact support portion supported by peripheral edge portions. The contact support portion includes a first tab portion that is connected to the peripheral edge portions and extends in a direction away from the frame portion, a bridge portion that is connected to the first tab portion and extends in a direction that differs from the direction in which the first tab portion extends, and a second tab portion that is connected to the bridge portion and has a free-end portion that extends toward the frame portion.

20 Claims, 15 Drawing Sheets

(56) References Cited

U.S. PATENT DOCUMENTS

| | | | | |
|---|---|---|---|---|
| 2020/0235506 | A1* | 7/2020 | Hosoda .................. | H01R 13/20 |
| 2021/0066854 | A1* | 3/2021 | Hosoda ................ | H01R 13/641 |
| 2021/0175649 | A1* | 6/2021 | Amemori ............. | H01R 12/716 |
| 2023/0402781 | A1* | 12/2023 | Morita ................... | H01R 13/42 |

FOREIGN PATENT DOCUMENTS

| | | | | | |
|---|---|---|---|---|---|
| JP | 2020-102462 | A | | 7/2020 | |
| KR | 10-2020-0145713 | A | | 12/2020 | |
| WO | WO-2020040004 | A1 | * | 2/2020 | ......... H01R 13/6594 |

* cited by examiner

ELECTRICAL CONNECTOR AND ELECTRICAL CONNECTOR SET HAVING THE ELECTRICAL CONNECTOR

CROSS-REFERENCE TO RELATED APPLICATIONS

This application claims benefit of priority to International Patent Application No. PCT/JP2022/006622, filed Feb. 18, 2022, and to Japanese Patent Application No. 2021-034291, filed Mar. 4, 2021, the entire contents of each are incorporated herein by reference.

BACKGROUND

Technical Field

The present disclosure relates to an electrical connector and an electrical connector set having the electrical connector.

Background Art

For example, Japanese Patent No. 6418324 discloses a connector set including a male multipole connector for electrically connecting circuit boards and a counterpart female connector that mates with the male multipole connector. When the multipole connector mates with the counterpart connector, a convex portion provided in an outer frame portion of an external terminal of the multipole connector mates with a concave portion provided in an inner frame portion of the external terminal of the counterpart connector.

SUMMARY

In the mating structure described above, the convex portion of the outer frame portion and the concave portion of the inner frame portion are electrically connected to each other, but a minute gap is present between the mounting portion of the external terminal of the male multipole connector and top surface of the external terminal of the counterpart female connector, and accordingly, no electrical connection is made in this gap. Since an electrical connection between the convex portion of the outer frame portion and the concave portion of the inner frame portion is apart from the mounting portion of the external terminal, a potential difference with respect to the mounting portion of the external terminal is present. This potential difference may cause unnecessary high-frequency radiation noise.

Accordingly, the present disclosure provides an electrical connector that effectively suppresses unnecessary radiation noise and an electrical connector set having the electrical connector.

An electrical connector according to an aspect of the present disclosure includes an internal terminal; an insulating member that holds the internal terminal; and an external terminal that surrounds the internal terminal. The external terminal includes a peripheral edge portion that covers a frame portion of the insulating member, and a contact support portion that is supported by the peripheral edge portion. The contact support portion includes a first tab portion that is connected to the peripheral edge portion and extends in a direction away from the frame portion, a bridge portion that is connected to the first tab portion and extends in a direction that differs from the direction in which the first tab portion extends, and a second tab portion that is connected to the bridge portion and extends toward the frame portion, and an end portion of the second tab portion that extends toward the frame portion is a free-end portion.

According to the present disclosure, since the free-end portion of the second tab portion is elastically displaced in the thickness direction of the insulating member as a reaction of the elastic displacement of the first tab portion, and electrical contact (in other words, electrical contact with the external terminal of the counterpart electrical connector) in the thickness direction of the insulating member is enabled, unnecessary radiation noise can be effectively suppressed.

DETAILED DESCRIPTION

Embodiments of an electrical connector 10 and an electrical connector set 1 including the electrical connector 10 according to the present disclosure will be described below with reference to the drawings. It should be noted that, for convenience, the drawings illustrate an X-axis, a Y-axis, and a Z-axis that are orthogonal to each other. In this specification, the longitudinal direction of a first insulating member 11 of the electrical connector 10, a lateral direction of the first insulating member 11 of the electrical connector 10, and a thickness direction of the first insulating member 11 of the electrical connector 10 are defined as an X-axis direction, a Y-axis direction, and a Z-axis direction, respectively. It should be noted that the length direction of the first insulating member (insulating member) 11 includes both the longitudinal direction and the lateral direction of the first insulating member (insulating member) 11.

[Electrical Connector Set]

Figure 1:
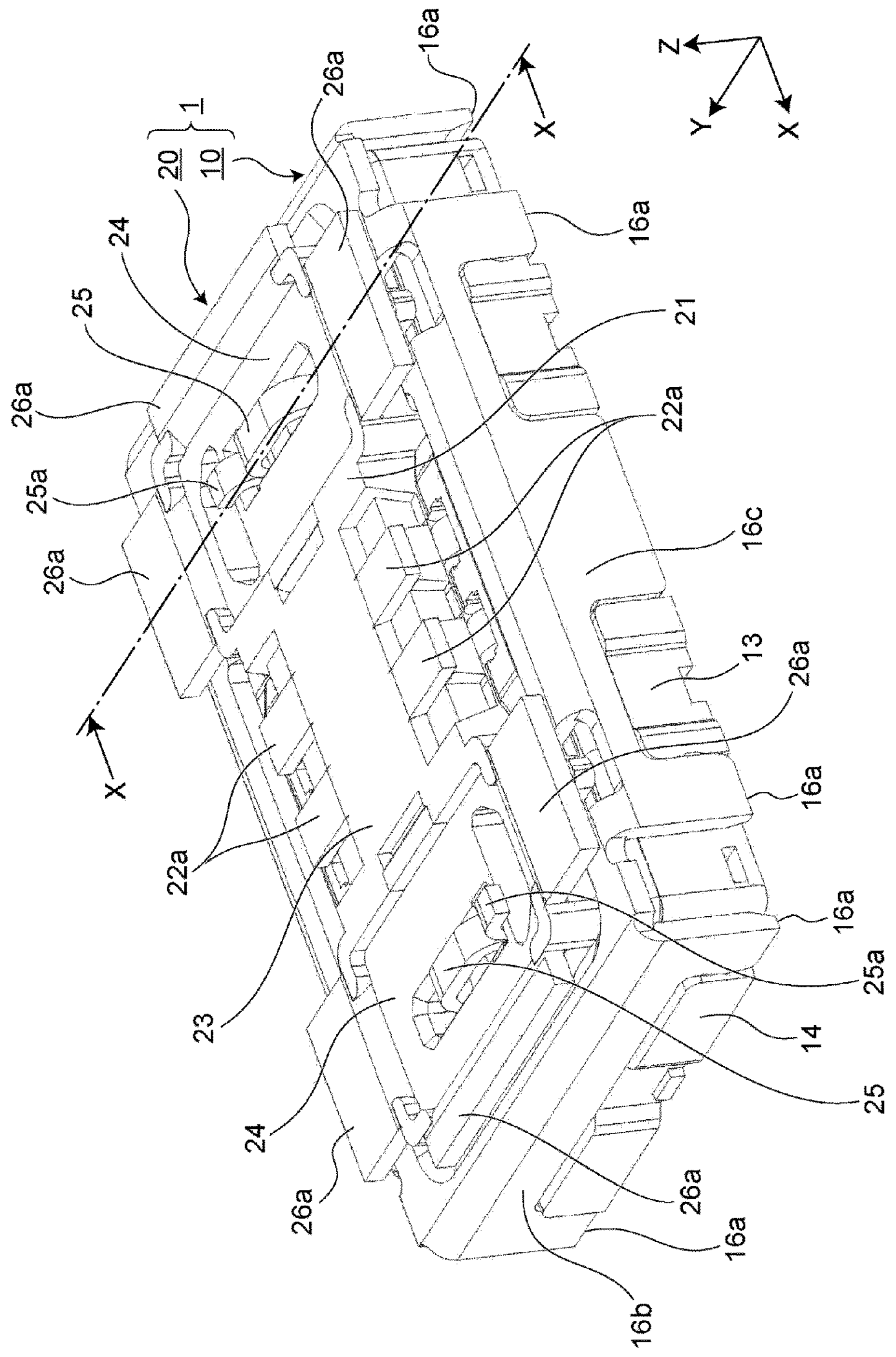
FIG. 1 is a perspective view illustrating an electrical connector set according to a first embodiment.
Figure 2:
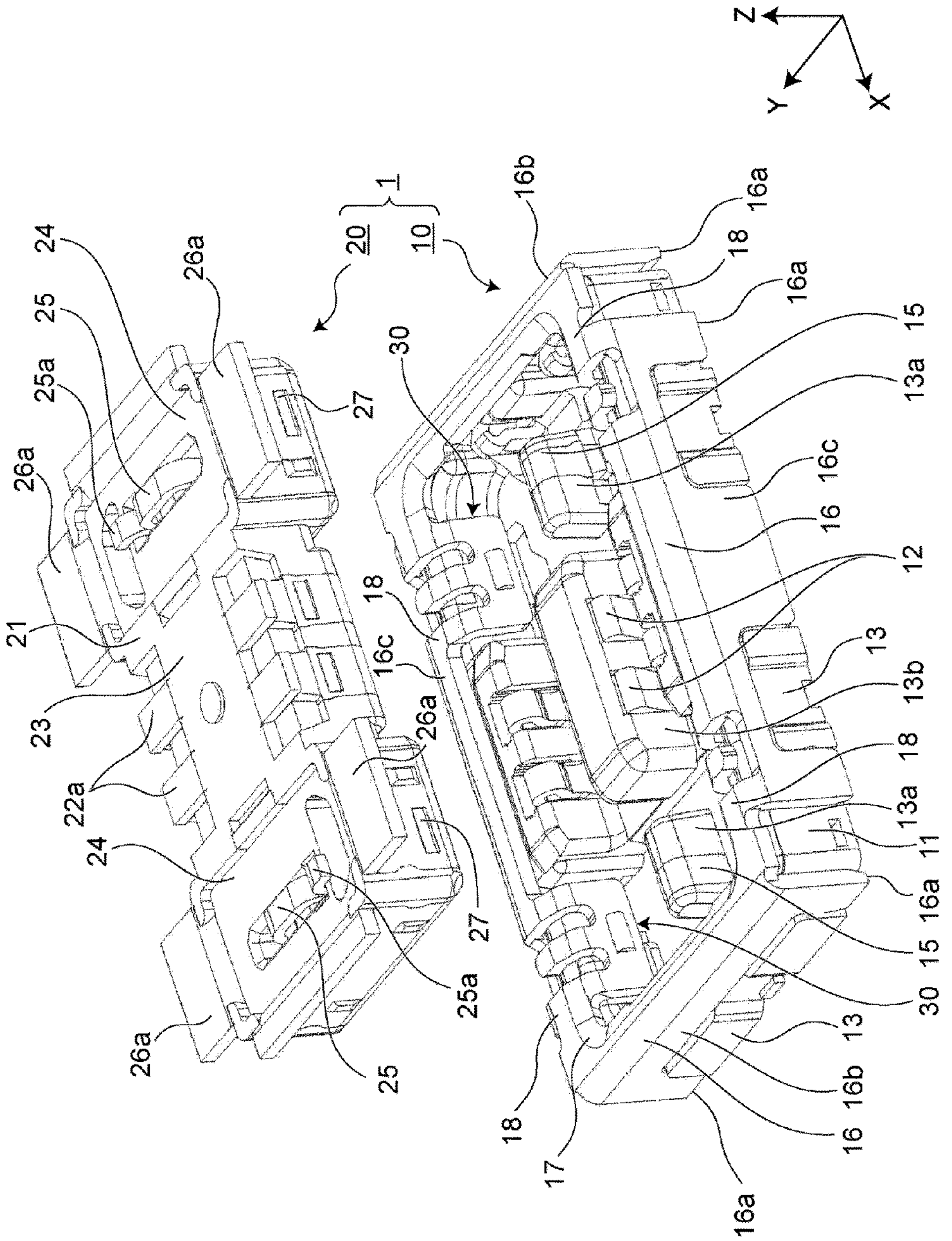
FIG. 2 is a perspective view of an electrical connector and a counterpart electrical connector that constitutes the electrical connector set illustrated in FIG. 1.

FIG. 1 is a perspective view illustrating the electrical connector set 1 according to a first embodiment. FIG. 2 is a perspective view of a first connector 10 and a second connector 20 that constitute the electrical connector set 1 illustrated in FIG. 1.

As illustrated in FIGS. 1 and 2, the electrical connector set 1 includes a first connector (electrical connector) 10 and a second connector (counterpart electrical connector) 20 that detachably mates with the first connector 10 in the Z-axis direction (the thickness direction of the insulating member, that is, the insertion-removal direction). In the electrical connector set 1, the first connector 10 and the second connector 20 mate with each other by the second connector 20 being moved in the Z-axis direction toward the first connector 10 with the second connector 20 facing the first connector 10.

[First Connector]

Figure 5:
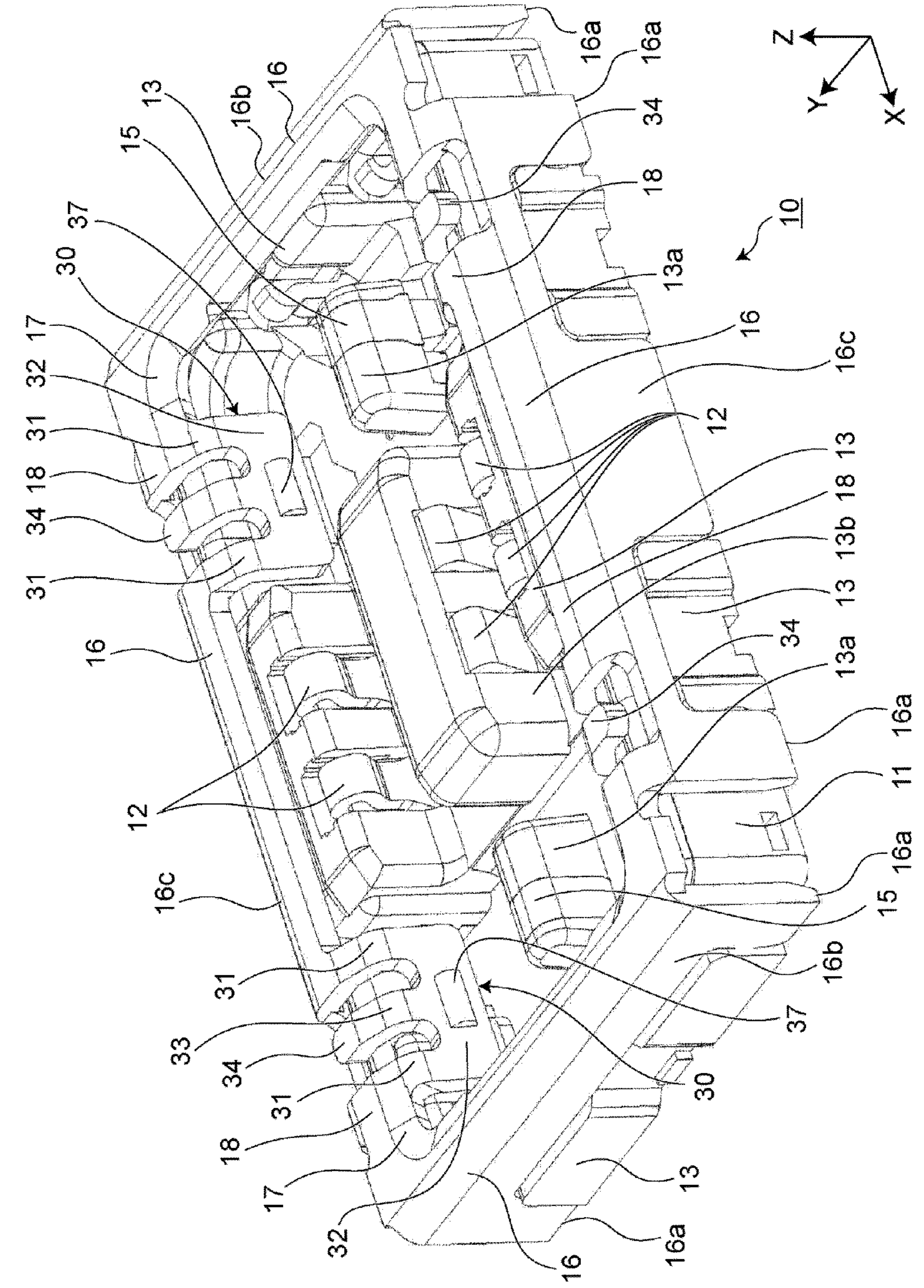
FIG. 5 is a perspective view of the electrical connector illustrated in FIG. 2.
Figure 6:
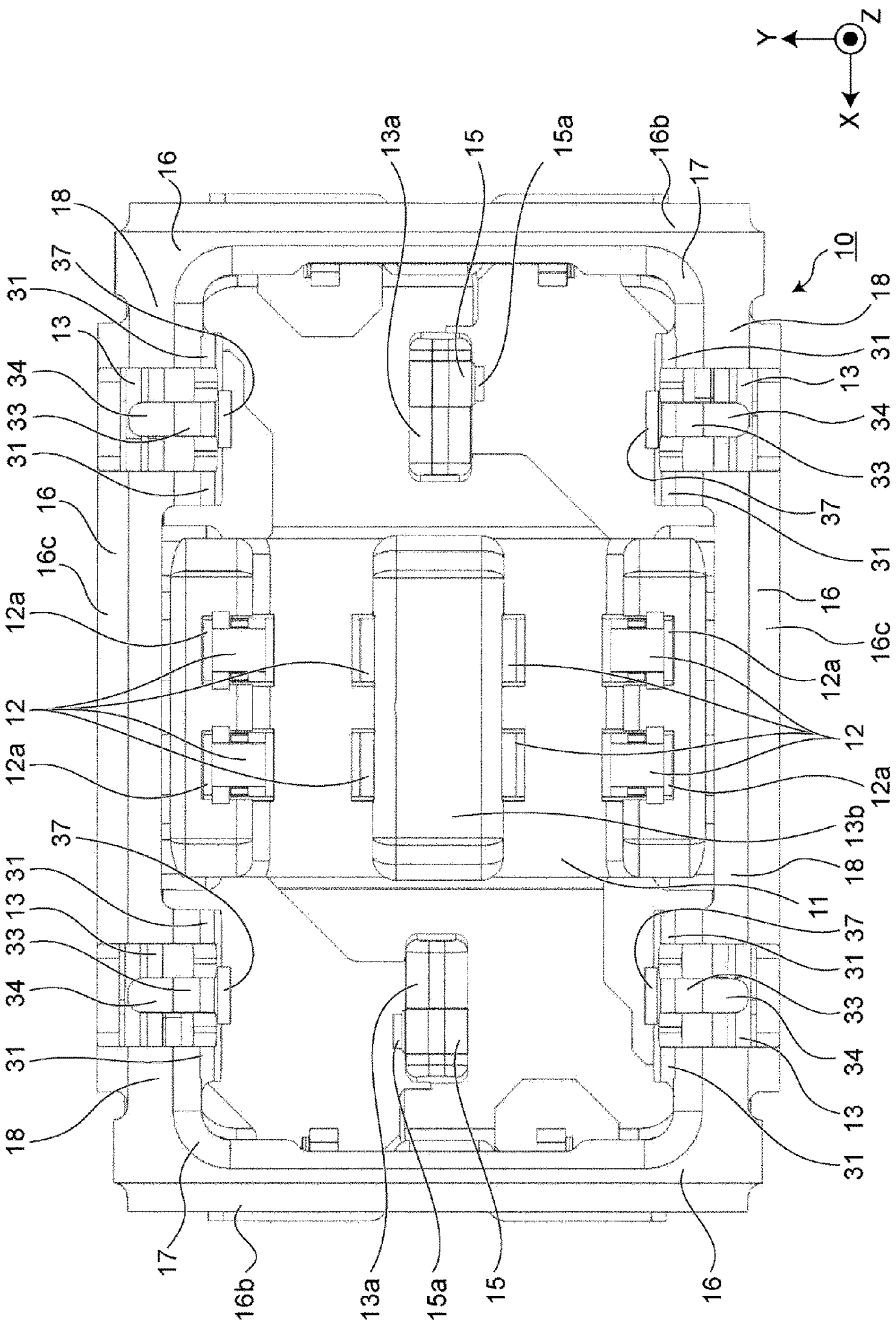
FIG. 6 is a plan view of the electrical connector illustrated in FIG. 2.

First, the schematic structure of the first connector 10 will be described with reference to FIGS. 5 and 6. FIG. 5 is a perspective view of the electrical connector illustrated in FIG. 2. FIG. 6 is a plan view of the electrical connector 10 illustrated in FIG. 2.

The first connector 10 includes the first insulating member (insulating member) 11, first internal terminals (internal terminals) 12, first shield terminals (internal terminals) 15, and first external terminals (external terminals) 16.

The first insulating member 11 may be made of, for example, an electrically insulating resin, such as a liquid crystal polymer. The first insulating member 11 includes a first frame portion (frame portion) 13, first shield holding portions (terminal holding portions) 13*a*, and a first terminal holding portion (terminal holding portion) 13*b*. The first terminal holding portion 13*b* is disposed substantially in the middle in the X-axis direction (the longitudinal direction of the insulating member, that is, the length direction) of the first connector 10, and the two first shield holding portions 13*a* are disposed apart from each other on both sides in the X-axis direction of the first connector 10.

The first terminal holding portion 13*b* of the first insulating member 11 has a first internal terminal attachment portion having, for example, a concave shape. First internal terminals 12 are held by attaching the first internal terminals 12 to the first internal terminal attachment portion. The first internal terminals 12 are disposed in the first terminal holding portion 13*b* located substantially in the middle in the X-axis direction of the first connector 10, and each of the first internal terminals 12 includes a plurality of connection terminals (having, for example, a concave shape) arranged in the X-axis direction. The first internal terminal 12 has, for example, a concave shape and is also referred to as a female multipolar connection terminal.

In the first internal terminals 12 illustrated in FIG. 5, two connection terminals arranged in a row in the X-axis direction are disposed apart from each other in the Y-axis direction (the direction orthogonal to the longitudinal direction of the first insulating member 11, that is, the lateral direction) as a row on one side and a row on the other side. In this structure, many first internal terminals 12 can be disposed in a limited-size region of the first terminal holding portion 13*b*. It should be noted that the arrangement of the multipolar first internal terminals 12 is not limited to two rows on one side and the other side and may be one row or three or more rows. In addition, the number of the first internal terminals 12 for each row is not limited to two and may be one or three or more.

The first internal terminal 12 is, for example, a conductor connected to the signal potential or the ground potential and is formed by bending a rod-shaped member having conductivity. The first internal terminal 12 may be made of, for example, phosphor bronze. Phosphor bronze is a conductive material that is elastically deformable. The surface of the first internal terminal 12 may be plated with, for example, gold. The first internal terminal 12 has a first internal mounting portion 12*a* to be mounted on a land electrode of a circuit board (not illustrated). The first internal mounting portion 12*a* is formed at a side edge in the Y-axis direction.

The first shield holding portion (terminal holding portion) 13*a* has the conductive first shield terminal (internal terminal) 15 to suppress (that is, to isolate from the surroundings) interference of electromagnetic waves from the surroundings as much as possible. The first shield terminal 15 is held by the first shield holding portion 13*a*. The first shield terminal 15 has, for example, a convex shape and is also referred to as a male connection terminal. In the first shield terminal 15 illustrated in FIG. 5, one connection terminal is disposed in one row. It should be noted that the arrangement of the first shield terminals 15 is not limited to the example described above and may be two or more rows. In addition, the number of the first internal terminals 12 for each row is not limited to one and may be two or more. The first shield terminal 15 may be a female connection terminal having a concave shape.

The first shield terminal 15 is, for example, a conductor connected to a signal potential or a ground potential and is formed by bending a rod-shaped conductive member. For example, the first shield terminal 15 transmits a millimeter wave signal, which is higher in frequency than that of the first internal terminal 12. The first shield terminal 15 may be made of, for example, phosphor bronze. Phosphor bronze is a conductive material that is elastically deformable. The surface of the first shield terminal 15 may be plated with, for example, gold. The first shield terminal 15 has a first shield mounting portion (internal mounting portion) 15*a* to be mounted on a land electrode of a circuit board (not illustrated). The first shield mounting portion 15*a* is formed at a side edge in the Y-axis direction.

The first frame portion (frame portion) 13 has, for example, a rectangular shape in the Z-axis direction. The first frame portion (frame portion) 13 has a first external terminal attachment portion. A first external side portion 16*b* and a first external extending portion 16*c* of the corresponding first external terminal 16 are attached to the first external terminal attachment portion and are supported.

The first external terminal 16 includes the first external side portion 16*b* and the first external extending portion 16*c*. A plurality of first external mounting portions 16*a* to be mounted on a ground electrode of a circuit board (not illustrated) are provided at the lower ends in the Z-axis direction of the first external side portion 16*b* and the first external extending portion 16*c*.

The first external terminal 16 is a conductor connected to the ground potential. The first external terminal 16 is connected to the ground potential to shield the first internal terminal 12 and the first shield terminal 15 against electromagnetic waves from the outside and shield against unnecessary radiation from the first internal terminal 12 and the first shield terminal 15, and accordingly, the space surrounded by the first external terminal 16 can be an electromagnetic shielding space. That is, the first external terminal 16 electromagnetically shields the first internal terminal 12 and the first shield terminal 15 by surrounding the first internal terminal 12 and the first shield terminal 15. The first external terminal 16 may be made of, for example, phosphor bronze. Phosphor bronze is a conductive material that is elastically deformable. The first external terminal 16 is formed by, for example, bending.

[Second Connector]

Figure 3:
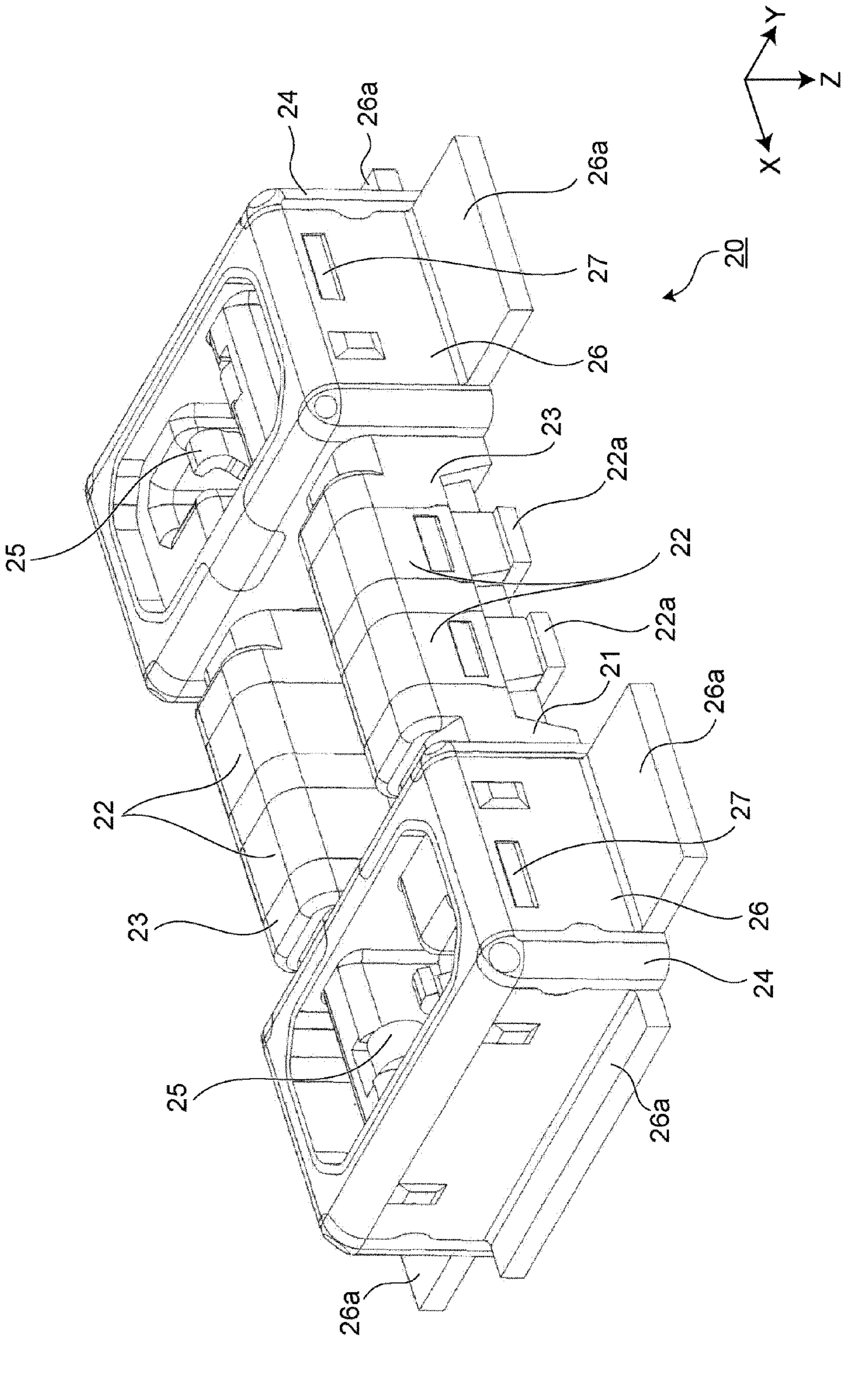
FIG. 3 is a perspective view of the counterpart electrical connector illustrated in FIG. 2.
Figure 4:
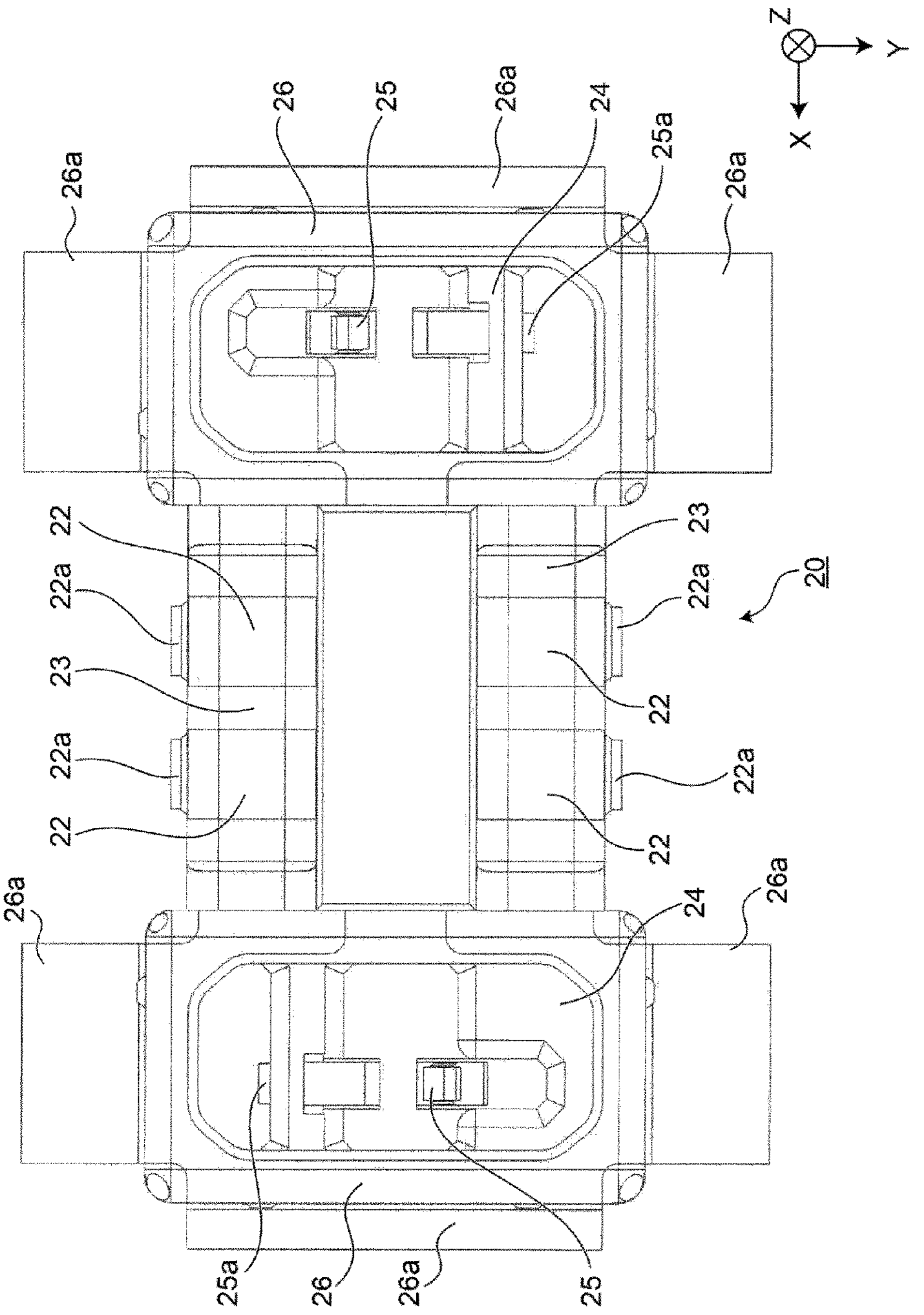
FIG. 4 is a plan view of the counterpart electrical connector illustrated in FIG. 2.

The schematic structure of the second connector 20 will be described with reference to FIGS. 3 and 4. FIG. 3 is a perspective view of the second connector 20 illustrated in FIG. 2. FIG. 4 is a plan view of the second connector 20 illustrated in FIG. 2.

The second connector 20 includes a second insulating member 21, second internal terminals 22, second shield terminals 25, and two second external terminals 26 and 26, which may be simply referred to below as the second external terminals 26.

The second insulating member 21 may be made of, for example, an electrically insulating resin, such as a liquid crystal polymer. The second insulating member 21 includes a second terminal holding portion 23 and two second shield holding portions 24. The second terminal holding portion 23 is disposed substantially in the middle in the X-axis direction of the second connector 20, and the two second shield holding portions 24 are disposed apart from each other on both sides in the X-axis direction of the second connector 20.

The second terminal holding portion 23 has, for example, a second internal terminal attachment portion having, for example, a convex shape. The second internal terminal 22 is held by attaching the second internal terminal 22 to the second internal terminal attachment portion. The second internal terminal 22 is disposed substantially in the middle in the X-axis direction of the second connector 20 and includes a plurality of connection terminals (having, for example, a convex shape) arranged in the X-axis direction. Accordingly, the second internal terminal 22 is also referred to as a male multipolar connection terminal. The second internal terminals 22 correspond to the first internal terminals 12 on a one-to-one basis. The second internal terminals 22 engage the corresponding first internal terminals 12 to make an electrical connection.

The second internal terminal 22 is a conductor connected to the signal potential or the ground potential and is formed by bending a rod-shaped conductive member. The second internal terminal 22 may be made of, for example, phosphor bronze. Phosphor bronze is a conductive material that is elastically deformable. The surface of the second internal terminal 22 may be plated with, for example, gold. The second internal terminal 22 has a second internal mounting portion **22*a* to be mounted on a land electrode of a circuit board (not illustrated). The second internal mounting portion 22*a*** is formed at a side edge in the Y-axis direction.

The second shield holding portion 24 has a second shield terminal attachment portion having, for example, a concave shape. The second shield terminal 25 is held by attaching the second shield terminal 25 to the second shield terminal attachment portion. The second internal terminals 22 are disposed in both end portions in the X-axis direction of the second connector 20. The second shield terminal 25 has, for example, a concave shape and is also referred to as a female connection terminal. The second shield terminals 25 correspond to the first shield terminals 15 on a one-to-one basis. The second internal terminals 25 engage the corresponding first internal terminals 15 to make an electrical connection.

The second shield terminal 25 is a conductor connected to the signal potential or the ground potential and is formed by bending a rod-shaped conductive member. The second shield terminal 25 may be made of, for example, phosphor bronze. Phosphor bronze is a conductive material that is elastically deformable. The surface of the second shield terminal 25 may be plated with, for example, gold. The second shield terminal 25 has a second shield mounting portion **25*a* to be mounted on a land electrode of a circuit board (not illustrated). The second shield mounting portion 25*a*** is formed at a side edge in the Y-axis direction.

Each of the two second shield holding portions 24 has a second external terminal attachment portion. The corresponding second external terminals 26 are attached to the second external terminal attachment portions and are supported. The second external terminal 26 has a second external mounting portion **26*a* to be mounted on a land electrode of a circuit board (not illustrated). The second external mounting portion 26*a*** is formed at the lower end in the Z-axis direction.

The second external terminal 26 is a conductor connected to the ground potential. The second external terminal 26 is connected to the ground potential to shield the second shield terminal 25 against electromagnetic waves from the outside and shield against unnecessary radiation from the second shield terminal 25, and accordingly, the space surrounded by the second external terminal 26 can be an electromagnetic shielding space. That is, the second external terminal 26 electromagnetically shields the second shield terminal 25. The second external terminal 26 may be made of, for example, phosphor bronze. Phosphor bronze is a conductive material that is elastically deformable. The second external terminal 26 is formed by, for example, bending.

[First External Terminal (External Terminal)]

Figure 7:
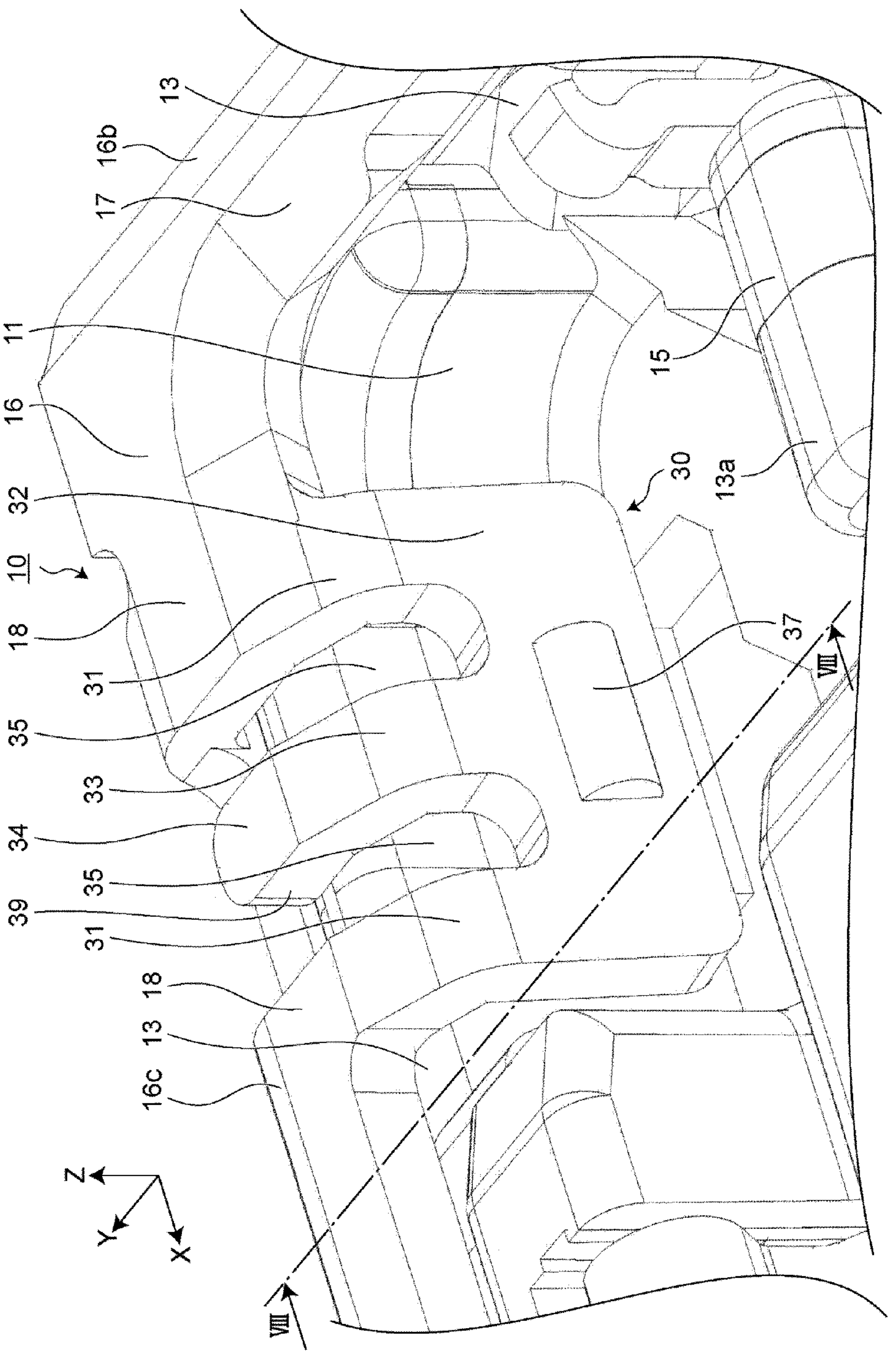
FIG. 7 is an enlarged view of a main part of the electrical connector illustrated in FIG. 5.
Figure 8:
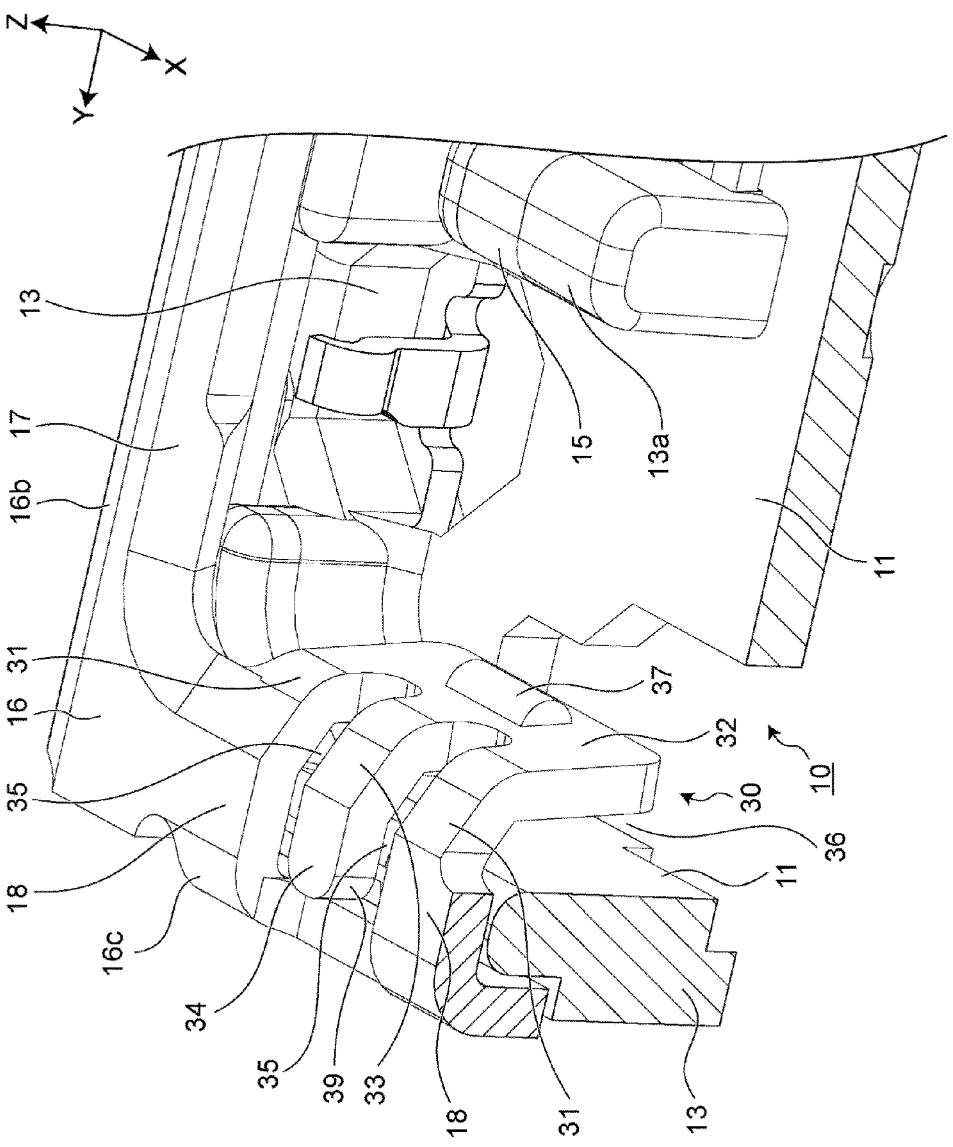
FIG. 8 is a perspective view of a cross section taken along line VIII-VIII in FIG. 7.
Figure 9:
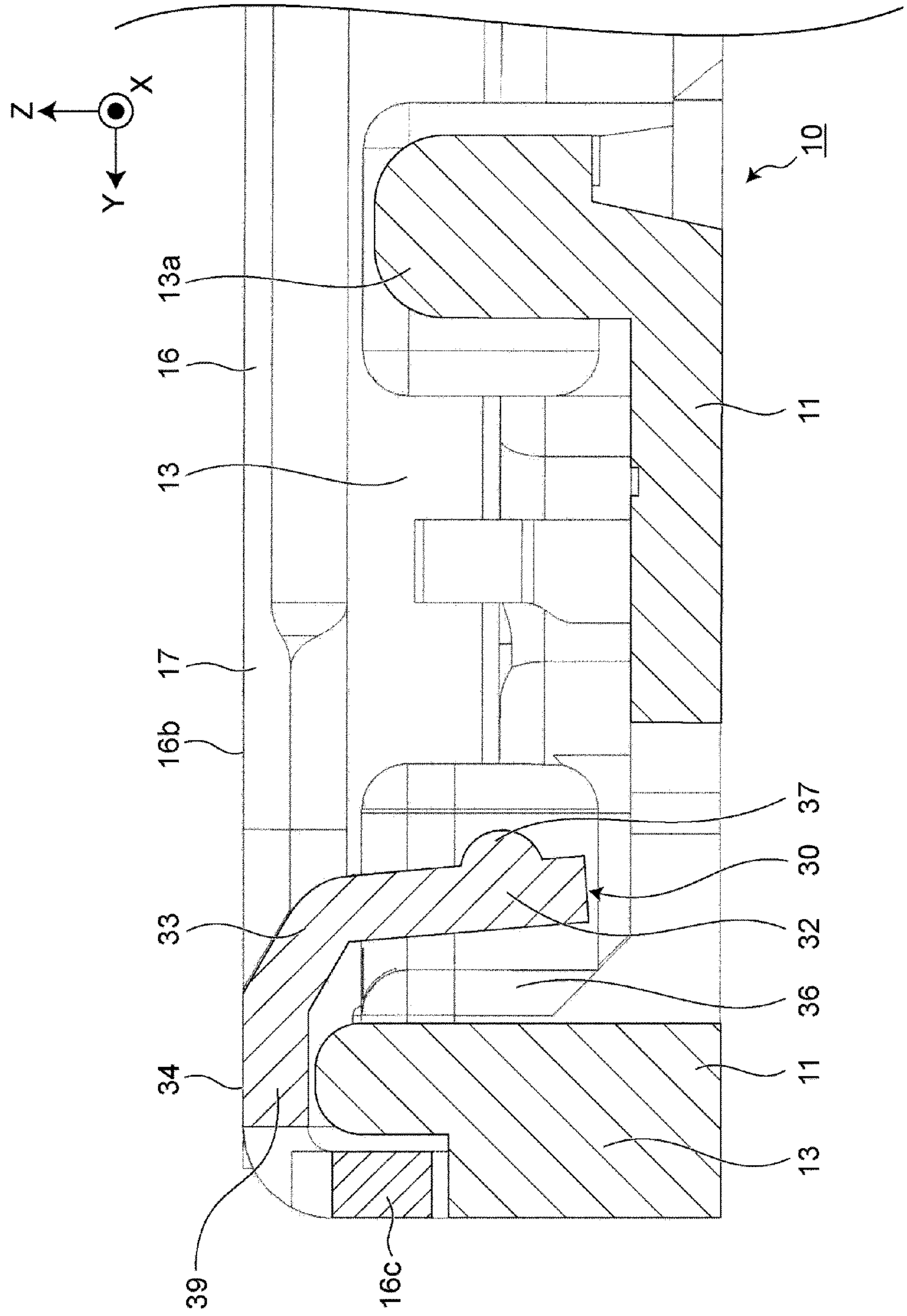
FIG. 9 is a sectional view taken along line VIII-VIII in FIG. 7.
Figure 10:
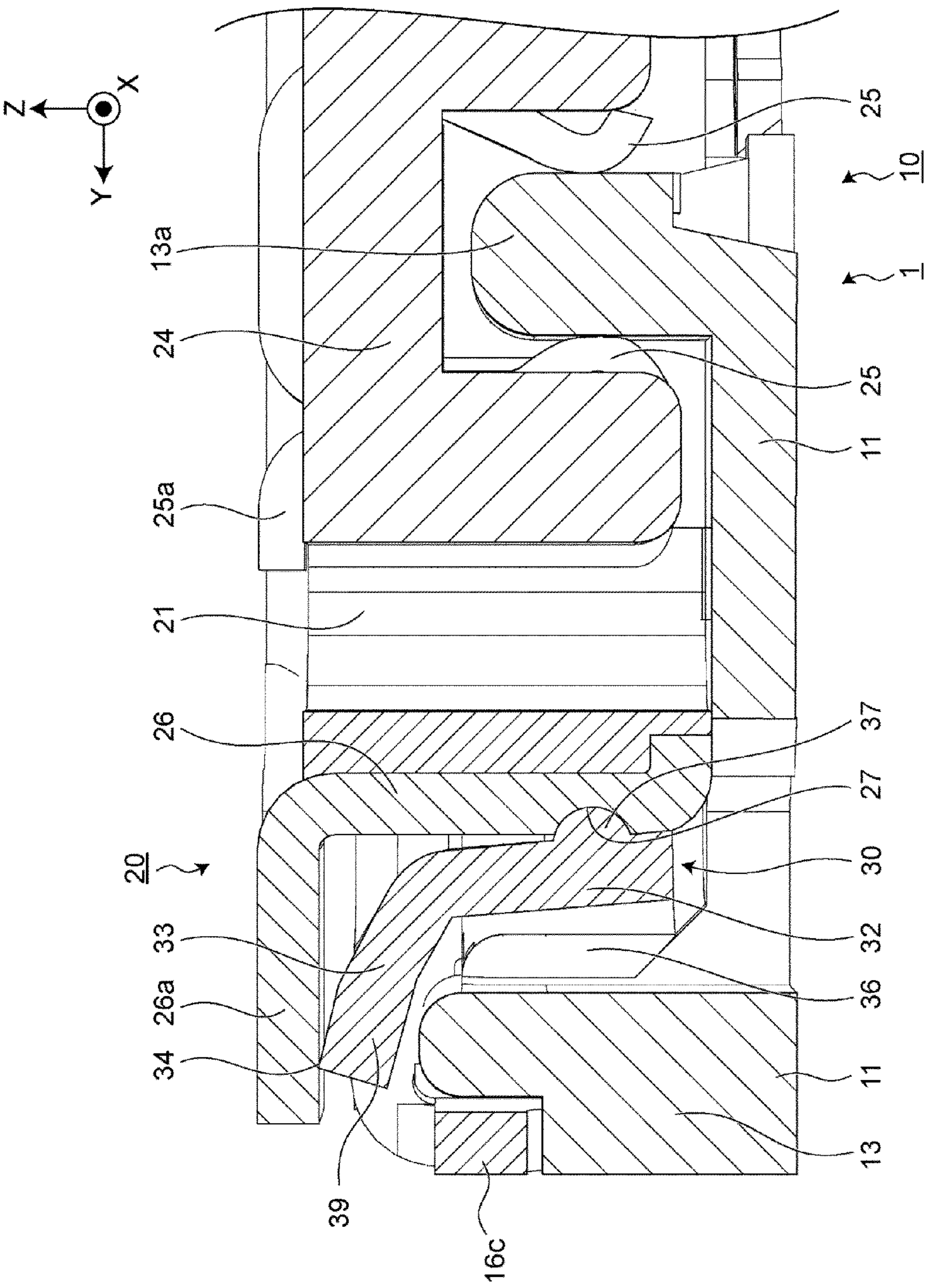
FIG. 10 illustrates a part of a cross section taken along line X-X in FIG. 1.

The first external terminal (external terminal) 16 will be described with reference to FIGS. 5 to 10. FIG. 7 is an enlarged view of a main part of the first connector 10 illustrated in FIG. 5. FIG. 8 is a perspective view of a cross section taken along line VIII-VIII in FIG. 7. FIG. 9 is a sectional view taken along line VIII-VIII in FIG. 7. FIG. 10 illustrates a part of a cross section taken along line X-X in FIG. 1.

As illustrated in FIGS. 5 and 6, the first external terminal 16 has a frame shape of a substantially rectangular contour in plan view in the Z-axis direction. The first external terminal 16 is circumferentially closed in plan view so as to surround the first internal terminal 12 and the first shield terminal 15. Here, the circumference is not necessarily limited to a polygonal circumference and may be, for example, a circular circumference, an elliptical circumference, or a shape formed by combining a polygonal circumference with a circular circumference.

The first external terminal 16 includes the first external side portions (peripheral edge portions) **16*b*, the first external extending portions (peripheral edge portions) 16*c*, guide portions 17, and contact support portions 30. The first external side portions 16*b* extend in the Y-axis direction and are provided in a side portion on one side and in a side portion on the other side in the X-axis direction. The first external extending portions 16*c* extend in the X-axis direction and are provided in the side portion on one side and the side portion on the other side in the Y-axis direction so as to connect the first external side portion 16*b* on one side and the first external side portion 16*b*** on the other side.

The guide portion 17 has a substantially rectangular shape in plan view and is inclined downward (from the outer side toward the inner side) so as to be away from the first frame portion 13. The guide portion 17 is used as a guide for accurately guiding the second external terminal 26 to the attachment cavity of the first connector when the second connector 20 is inserted into the first connector 10 in the Z-axis direction.

The plurality of contact support portions 30 are provided inward of the first external extending portion **16*c***. In the illustrated example, a total of four contact support portions

30 are provided: two contact support portions 30 on one side and two contact support portions 30 on the other side that face those on the one side. In other words, the plurality of contact support portions 30 are provided at positions facing each other. Accordingly, the plurality of contact support portions 30 provide an electrical connection with greater certainty.

An engaging convex portion 37 as the engaging portion is formed on the inner surface of each of the contact support portions 30. When the first connector 10 is mated with the second connector 20, the engaging convex portion 37 of the first external terminal 16 engages the engaged concave portion (engaged portion) 27 of the second external terminal 26. In this structure, mating is achieved with certainty without affecting the internal terminal 12 and the first shield terminal 15.

First Embodiment

As illustrated in FIGS. 7 and 8, the contact support portion 30 is elastically supported at both ends thereof by the first external extending portion (peripheral edge portion) 16*c*. The contact support portion 30 is disposed near the corner at which the first external side portion 16*b* intersects the first external extending portion 16*c*.

The contact support portion 30 includes a support tab portion (first tab portion) 31, a bridge portion 32, and a contact tab portion (second tab portion) 33. The support tab portion 31 is connected to the first external extending portion 16*c* and extends away from the first frame portion 13, which may be simply referred to below as the inner side. The support tab portion 31 has a bent or curved shape. The bridge portion 32 is connected to the support tab portion 31. The bridge portion 32 extends in a direction that differs from the extension direction of the support tab portion (first tab portion) 31, for example, in the X-axis direction (the longitudinal direction of the first insulating member 11). The engaging convex portion 37 described above is disposed on the bridge portion 32. The contact tab portion 33 is connected to the bridge portion 32 and extends toward the first frame portion 13, which may be simply referred to below as the outer side. The contact tab portion 33 is elastically supported at one end thereof by the bridge portion 32. In other words, the bridge portion 32 bridges the support tab portion 31 and the contact tab portion 33. The contact tab portion 33 has a bent or curved shape, for example, a shape bent or curved at a plurality of points.

The contact support portion 30 has the support tab portions 31 on one side and the other side in the length direction of the first insulating member 11. In other words, the contact support portion 30 has two support tab portions 31 and 31: the support tab portion 31 on one side and the support tab portion 31 on the other side. The bridge portion 32 is connected to the support tab portion (first tab portion) 31 on one side and the support tab portion (first tab portion) 31 on the other side. Accordingly, the contact support portion 30 is elastically supported at both ends thereof by the first external extending portion (peripheral edge portion) 16*c* via the support tab portion (first tab portion) 31 on one side and the support tab portion (first tab portion) 31 on the other side.

The contact tab portion 33 is located between the support tab portion 31 on one side and the support tab portion 31 on the other side, for example, in the middle between the support tab portion 31 on one side and the support tab portion 31 on the other side. The support tab portion 31 and the contact tab portion 33 are separated from each other by a notch 35. This can easily achieve a displacement direction conversion structure for converting the displacement in the Y-axis direction (the direction orthogonal to the longitudinal direction of the first insulating member 11, that is, the lateral direction) into the displacement in the Z-axis direction (the thickness direction of the first insulating member 11).

One end of the contact tab portion 33 is connected to the bridge portion 32, and the other end thereof has a free-end portion 39. In other words, the end portion of the contact tab portion (second tab portion) 33 that extends toward the first frame portion 13 is the free-end portion. The free-end portion 39 of the contact tab portion 33 has the contact portion 34. When the first connector 10 is not mated with the second connector 20, the height of the surface of the contact portion 34 is equal to or lower than that of the peripheral edge surface 18 and, for example, the surface of the contact portion 34 may be flush with the peripheral edge surface 18 of the first external extending portion (peripheral edge portion) 16*c*. This can suppress the end of the free-end portion 39 from being caught in (interfering with) the peripheral edge surface 18 of the first external extending portion (peripheral edge portion) 16*c*.

As illustrated in FIG. 9, a gap 36 is provided between the inner surface of the first frame portion 13 of the first insulating member 11 and the contact support portion 30. The gap 36 is dimensioned such that the contact support portion 30 can be elastically displaced to the outer side in the Y-axis direction (the direction orthogonal to the longitudinal direction of the first insulating member 11, that is, the lateral direction). When the contact support portion 30 is elastically displaced to the outer side in the Y-axis direction (the direction orthogonal to the longitudinal direction of the first insulating member 11, that is, the lateral direction), the support tab portion 31 is also elastically displaced to the outer side in the Y-axis direction (the direction orthogonal to the longitudinal direction of the first insulating member 11, that is, the lateral direction). The two contact tab portions 33 and 33 elastically supported at one end thereof by the bridge portions 32 move in a direction opposite to the movement of the support tab portion 31 with respect to the bridge portions 32 as a reaction of this displacement. Accordingly, the two contact tab portions 33 and 33 are elastically displaced to the inner side in the Y-axis direction (the direction orthogonal to the longitudinal direction of the first insulating member 11, that is, the lateral direction) with respect to the bridge portion 32. As described above, since the contact tab portion 33 has a bent or curved shape, the free-end portion 39 of the contact tab portion 33 is elastically displaced in the thickness direction (upward in the Z-axis direction in FIG. 9) of the first insulating member 11.

It is assumed that the first connector 10 is mated with the second connector 20 as illustrated in FIG. 10. In this case, as a reaction of the elastic displacement of the contact support portion 30 (support tab portion 31) toward the outer side in the Y-axis direction (the direction orthogonal to the longitudinal direction of the first insulating member 11, that is, the lateral direction), the free-end portion 39 of the contact tab portion 33 is elastically displaced in the thickness direction (upward in the Z-axis direction in FIG. 9) of the first insulating member 11. Accordingly, the contact support portion 30 has a displacement direction conversion structure for converting the displacement in the Y-axis direction (the direction orthogonal to the longitudinal direction of the first insulating member 11, that is, the lateral direction) into the displacement in the Z-axis direction (the thickness direction of the first insulating member 11). In addition, the contact portion 34 of the free-end portion 39 comes into contact with, for example, the second external mounting portion 26*a*, which faces the contact portion 34, of the second external terminal 26. Accordingly, even when a minute gap is present between the second external mounting portion 26*a* of the second external terminal 26 of the second connector 20 and the top surface of the first external terminal 16 of the first connector 10, electrical contact is made in this gap. Since this enables an electrical connection to the second external terminal 26 of the second connector 20 near the second external mounting portion 26*a*, unnecessary radiation noise can be effectively suppressed. In addition, since the contact support portion 30 is supported by the two first support tab portions 31 and 31, the rigidity of cantilever elastic support can be increased.

Second Embodiment

Figure 11:
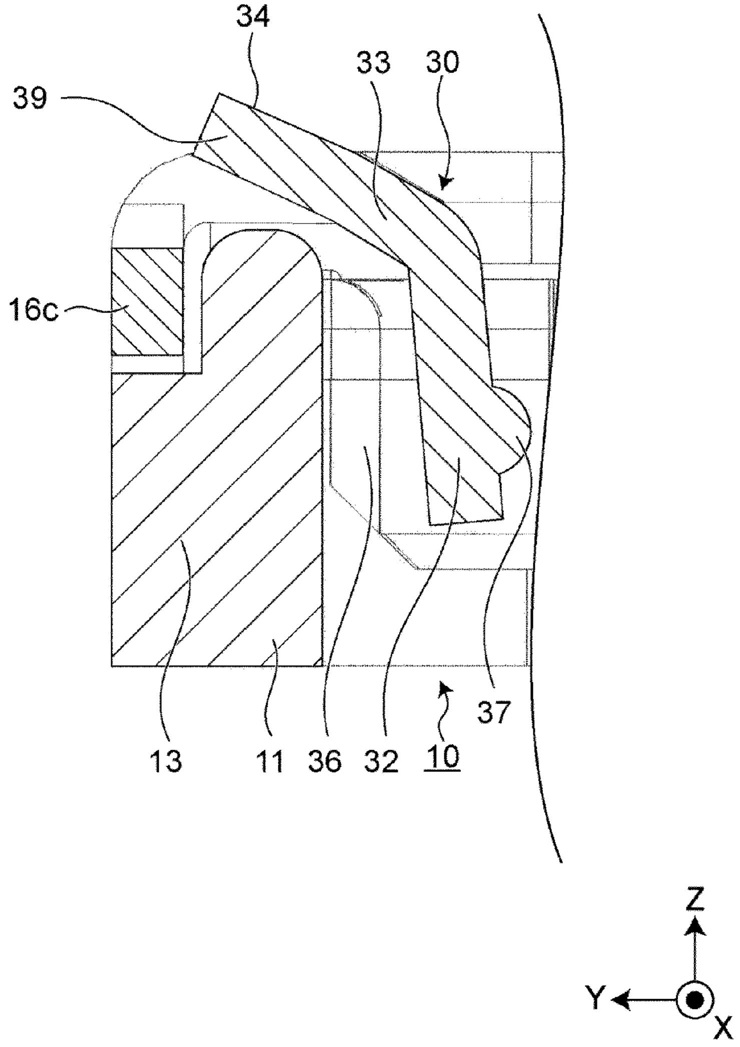
FIG. 11 is a sectional view for describing an electrical connector according to a second embodiment.

A second embodiment will be described with reference to FIG. 11. FIG. 11 is a sectional view for describing the first connector 10 according to the second embodiment.

In the first connector 10 according to the second embodiment, the contact tab portion 33 is bent or curved and linearly extends obliquely upward in portions close to the free-end portion 39.

As described above, when the contact support portion 30 is elastically displaced to the outer side in the Y-axis direction (the direction orthogonal to the longitudinal direction of the first insulating member 11, that is, the lateral direction), the support tab portion 31 is also elastically displaced to the outer side in the Y-axis direction (the direction orthogonal to the longitudinal direction of the first insulating member 11, that is, the lateral direction). The contact tab portion 33 moves in a direction opposite to the movement of the support tab portion 31 as a reaction of this displacement and is elastically displaced to the inner side with respect to the bridge portion 32. As a result, the free-end portion 39 of the contact tab portion 33 is elastically displaced in the thickness direction (upward in the Z-axis direction in FIG. 11) of the first insulating member 11.

When the first connector 10 is mated with the second connector 20, the free-end portion 39 of the contact tab portion 33 is elastically displaced in the thickness direction (upward in the Z-axis direction in FIG. 11) of the first insulating member 11, and accordingly, the end of the free-end portion 39 comes into contact with, for example, the second external mounting portion 26*a*, which faces the free-end portion 39, of the second external terminal 26. Since this enables an electrical connection to the second external terminal 26 of the second connector 20 near the second external mounting portion 26*a*, unnecessary radiation noise can be effectively suppressed. In addition, since the free-end portion 39 extends so as to project obliquely upward, electrical contact is possible even when the amount of elastic displacement of the contact tab portion 33 is small.

Third Embodiment

Figure 12:
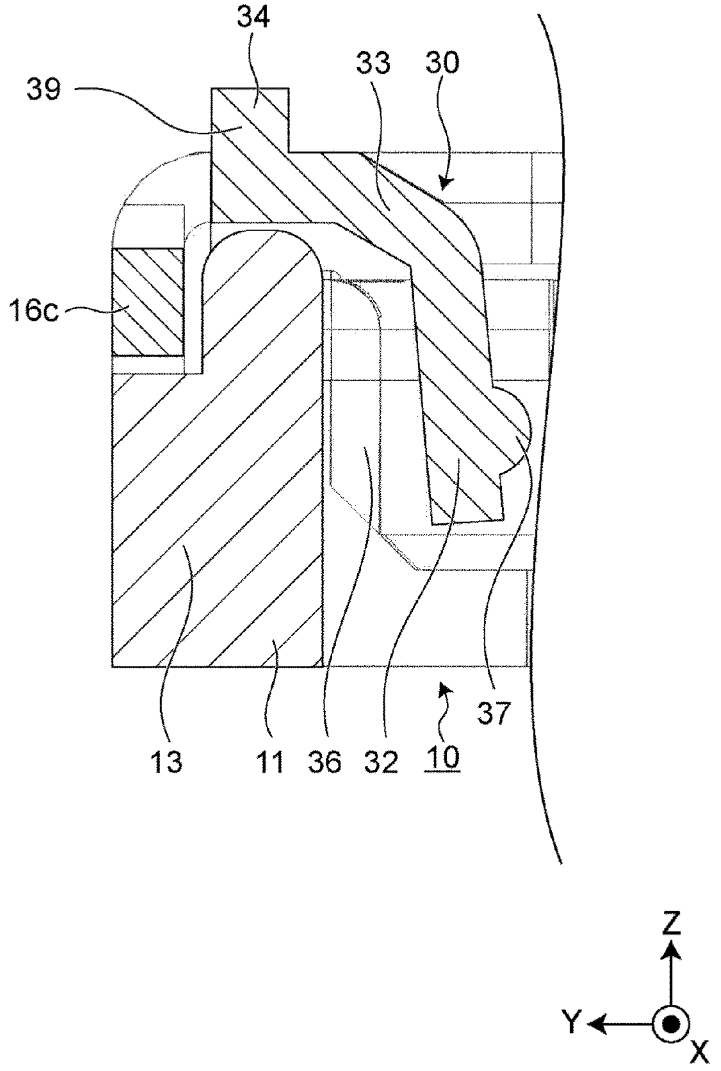
FIG. 12 is a sectional view for describing an electrical connector according to a third embodiment.

A third embodiment will be described with reference to FIG. 12. FIG. 12 is a sectional view for describing the first connector 10 according to the third embodiment.

In the first connector 10 according to the third embodiment, the free-end portion 39 of the contact tab portion 33 has a shape that projects in the thickness direction (upward in the Z-axis direction in FIG. 12) of the first insulating member 11.

As described above, when the contact support portion 30 is elastically displaced to the outer side in the Y-axis direction (the direction orthogonal to the longitudinal direction of the first insulating member 11, that is, the lateral direction), the support tab portion 31 is also elastically displaced to the outer side in the Y-axis direction (the direction orthogonal to the longitudinal direction of the first insulating member 11, that is, the lateral direction). The contact tab portion 33 moves in a direction opposite to the movement of the support tab portion 31 as a reaction of this displacement and is elastically displaced to the inner side with respect to the bridge portion 32. As a result, the free-end portion 39 of the contact tab portion 33 is elastically displaced in the thickness direction (upward in the Z-axis direction in FIG. 12) of the first insulating member 11.

When the first connector 10 is mated with the second connector 20, the free-end portion 39 of the contact tab portion 33 is elastically displaced in the thickness direction (upward in the Z-axis direction in FIG. 12) of the first insulating member 11, and accordingly, the projecting free-end portion 39 comes into contact with, for example, the second external mounting portion 26*a*, which faces the free-end portion 39, of the second external terminal 26. Since this enables an electrical connection to the second external terminal 26 of the second connector 20 near the second external mounting portion 26*a*, unnecessary radiation noise can be effectively suppressed. In addition, since the free-end portion 39 projects upward, electrical contact is possible even when the amount of elastic displacement of the contact tab portion 33 is small.

Fourth Embodiment

Figure 13:
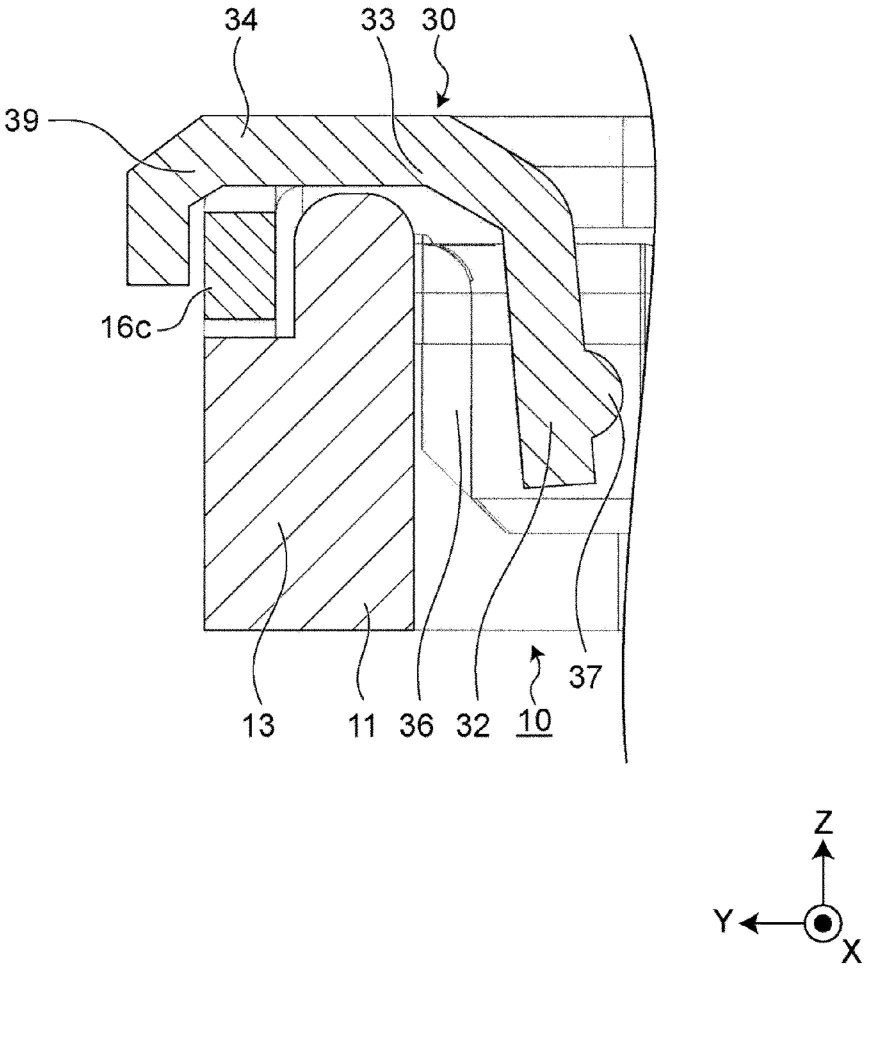
FIG. 13 is a sectional view for describing an electrical connector according to a fourth embodiment.

A fourth embodiment will be described with reference to FIG. 13. FIG. 13 is a sectional view for describing the first connector 10 according to the fourth embodiment.

In the first connector 10 according to the fourth embodiment, the contact tab portion 33 has an inverted U shape in which a contact tab portion 33 part close to the free-end portion 39 is folded downward.

As described above, when the contact support portion 30 is elastically displaced to the outer side in the Y-axis direction (the direction orthogonal to the longitudinal direction of the first insulating member 11, that is, the lateral direction), the support tab portion 31 is also elastically displaced to the outer side in the Y-axis direction (the direction orthogonal to the longitudinal direction of the first insulating member 11, that is, the lateral direction). The contact tab portion 33 moves in a direction opposite to the movement of the support tab portion 31 as a reaction of this displacement and is elastically displaced to the inner side with respect to the bridge portion 32. As a result, the free-end portion 39 of the contact tab portion 33 is elastically displaced in the thickness direction (upward in the Z-axis direction in FIG. 13) of the first insulating member 11.

When the first connector 10 is mated with the second connector 20, the free-end portion 39 of the contact tab portion 33 is elastically displaced in the thickness direction (upward in the Z-axis direction in FIG. 13) of the first insulating member 11, and accordingly, the contact portion 34 of the free-end portion 39 comes into contact with, for example, the second external mounting portion 26*a*, which faces the free-end portion 39, of the second external terminal 26. Since this enables an electrical connection to the second external terminal 26 of the second connector 20 near the second external mounting portion 26*a*, unnecessary radiation noise can be effectively suppressed. In addition, since the free-end portion 39 is folded downward to have an inverted U shape, it is possible to suppress the end of the free-end portion 39 from being caught in (interfering with)

the peripheral edge surface 18 of the first external extending portion (peripheral edge portion) 16*c*.

Fifth Embodiment

Figure 14:
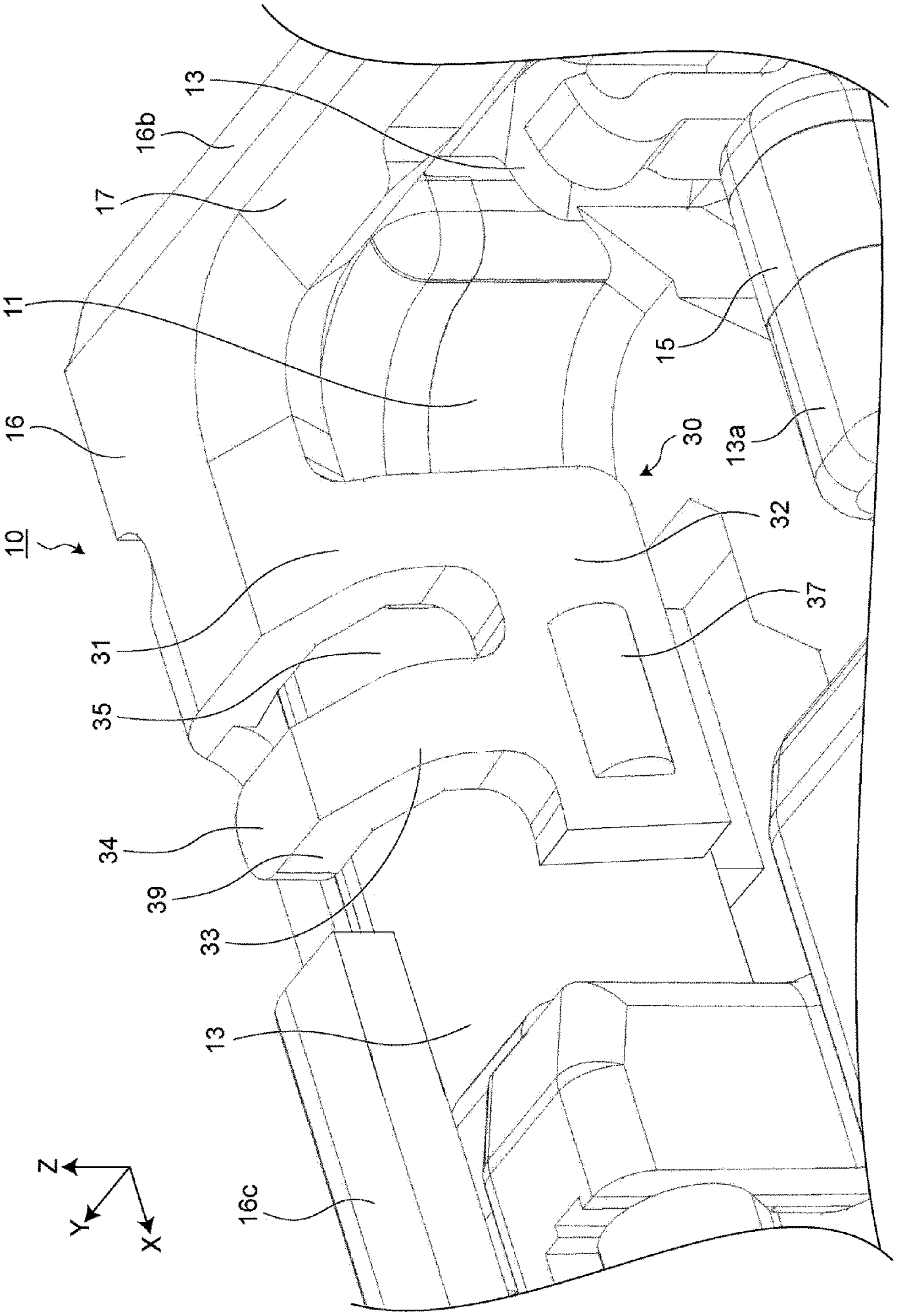
FIG. 14 is a perspective view for describing an electrical connector according to a fifth embodiment.

A fifth embodiment will be described with reference to FIG. 14. FIG. 14 is a perspective view for describing the first connector 10 according to the fifth embodiment.

In the first connector 10 according to the fifth embodiment, the contact support portion 30 includes the support tab portion (first tab portion) 31, the bridge portion 32, and the contact tab portion (second tab portion) 33, but the support tab portion 31 is provided on only one side in the length direction of the first insulating member 11. The fifth embodiment differs from the first embodiment illustrated in FIG. 7 in that the contact support portion 30 has one support tab portion 31 and one contact tab portion 33. In addition, the contact support portion 30 is elastically supported at one end thereof by the first external extending portion (peripheral edge portion) 16*c* via one support tab portion 31.

When the contact support portion 30 is elastically displaced to the outer side in the Y-axis direction (the direction orthogonal to the longitudinal direction of the first insulating member 11, that is, the lateral direction), the support tab portion 31 is also elastically displaced to the outer side in the Y-axis direction (the direction orthogonal to the longitudinal direction of the first insulating member 11, that is, the lateral direction). The contact tab portion 33 on one side moves in a direction opposite to the movement of the support tab portion 31 as a reaction of this displacement and is elastically displaced to the inner side with respect to the bridge portion 32. As a result, the free-end portion 39 of the contact tab portion 33 is elastically displaced in the thickness direction (upward in the Z-axis direction in FIG. 14) of the first insulating member 11.

When the first connector 10 is mated with the second connector 20, the free-end portion 39 of the contact tab portion 33 is elastically displaced in the thickness direction (upward in the Z-axis direction in FIG. 14) of the first insulating member 11, and accordingly, the contact portion 34 of the free-end portion 39 comes into contact with, for example, the second external mounting portion 26*a*, which faces the free-end portion 39, of the second external terminal 26. Since this enables an electrical connection to the second external terminal 26 of the second connector 20 near the second external mounting portion 26*a*, unnecessary radiation noise can be effectively suppressed. In addition, since the contact support portion 30 is supported via one support tab portion 31, the rigidity of cantilever elastic support can be adjusted to a relatively low value.

Sixth Embodiment

Figure 15:
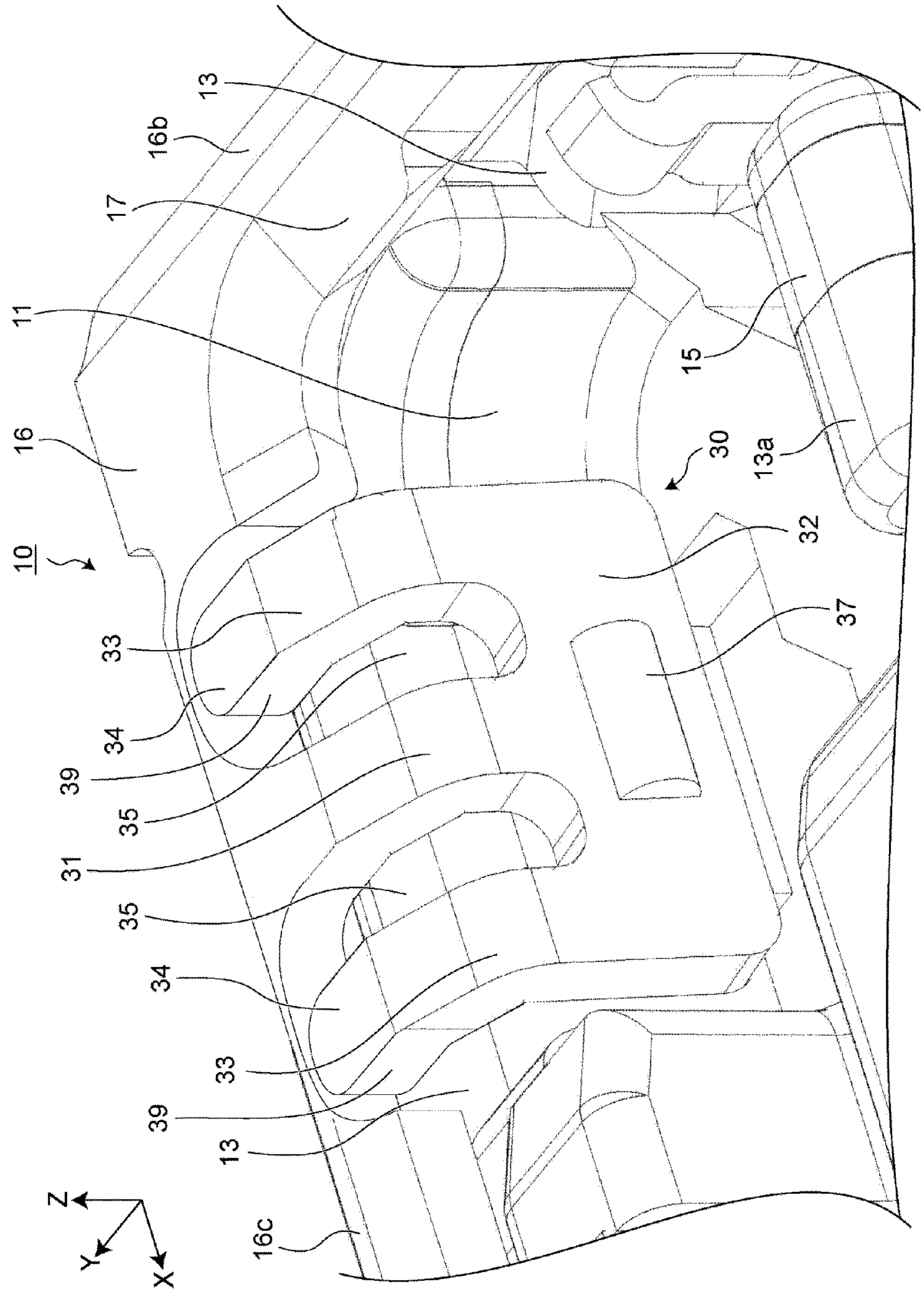
FIG. 15 is a perspective view for describing an electrical connector according to a sixth embodiment.

A sixth embodiment will be described with reference to FIG. 15. FIG. 15 is a perspective view for describing the first connector 10 according to the sixth embodiment.

In the first connector 10 according to the sixth embodiment, the contact support portion 30 includes the support tab portion (first tab portion) 31, the bridge portion 32, and the contact tab portions (second tab portion) 33, and the number of the support tab portions 31 is one and the number of the contact tab portions 33 is two. Accordingly, the contact support portion 30 is elastically supported at one end thereof by the first external extending portion (peripheral edge portion) 16*c* via one support tab portion 31. The bridge portion 32 is connected to the support tab portion 31. The bridge portion 32 extends in a direction that differs from the extension direction of the support tab portion (first tab portion) 31, for example, in the X-axis direction (the longitudinal direction of first insulating member 11).

The contact support portion 30 has the contact tab portions 33 on one side and the other side in the length direction of the first insulating member 11. In other words, the contact support portion 30 has the two contact tab portions 33 and 33: the contact tab portion 33 on one side and the contact tab portion 33 on the other side. The bridge portion 32 is connected to the contact tab portion 33 (second tab portion) on one side and the contact tab portion 33 (second tab portion) on the other side. The support tab portion 31 is connected to the first external extending portion (peripheral edge portion) and located between the contact tab portion 33 on one side and the contact tab portion 33 on the other side, for example, in the middle between the contact tab portion 33 on one side and the contact tab portion 33 on the other side. The support tab portion 31 and the contact tab portion 33 are separated from each other by the notch 35. This can easily achieve a displacement direction conversion structure for converting the displacement in the Y-axis direction (the direction orthogonal to the longitudinal direction of the first insulating member 11, that is, the lateral direction) into the displacement in the Z-axis direction (the thickness direction of the first insulating member 11).

One end of each of the two contact tab portions 33 and 33 is connected to the bridge portion 32 and the other end thereof has the free-end portion 39. In other words, the end portions of the contact tab portions (second tab portions) 33 that extend toward the first frame portion 13 are the free-end portions. The free-end portions 39 of the contact tab portions 33 have the contact portions 34. When the first connector 10 is not mated with the second connector 20, the height of the surface of the contact portion 34 is equal to or lower than that of the peripheral edge surface 18 and, for example, the surface of the contact portion 34 is flush with the peripheral edge surface 18 of the first external extending portion (peripheral edge portion) 16*c*.

When the contact support portion 30 is elastically displaced to the outer side in the Y-axis direction (the direction orthogonal to the longitudinal direction of the first insulating member 11, that is, the lateral direction), the support tab portion 31 is also elastically displaced to the outer side in the Y-axis direction (the direction orthogonal to the longitudinal direction of the first insulating member 11, that is, the lateral direction). The contact tab portion 33 on one side and the contact tab portion 33 on the other side move in a direction opposite to the movement of the support tab portion 31 as a reaction of this displacement and is elastically displaced to the inner side with respect to the bridge portion 32. As a result, the free-end portion 39 of the contact tab portion 33 is elastically displaced in the thickness direction (upward in the Z-axis direction in FIG. 15) of the first insulating member 11.

When the first connector 10 is mated with the second connector 20, the free-end portions 39 of the two contact tab portions 33 and 33 are elastically displaced in the thickness direction (upward in the Z-axis direction in FIG. 15) of the first insulating member 11, and accordingly, the contact portions 34 of the free-end portions 39 come into contact with, for example, the second external mounting portion 26*a*, which faces the free-end portion 39, of the second external terminal 26. Since this enables an electrical connection to the second external terminal 26 of the second connector 20 near the second external mounting portion 26*a*, unnecessary radiation noise can be effectively suppressed. Since the two contact tab portions 33 and 33 are in contact with the second external mounting portion 26*a*, electrical contact with greater certainty is provided.

Specific embodiments of the present disclosure have been described, but the present disclosure is not limited to the embodiments described above, and various changes can be made within the scope of the present disclosure.

The width in the X-axis direction of the contact tab portion 33 is greater than the width in the X-axis direction of the notch 35. In other words, preferably, the width in the X-axis direction of the notch 35 is smaller, and the width in the X-axis direction of the contact tab portion 33 is greater. This can increase the contact region of the contact tab portion 33 and suppress the unnecessary high-frequency radiation noise from being input and output through the notch 35. The width in the X-axis direction of the notch 35 can be equal to or less than ¼ the wavelength of the maximum operating frequency, for example, equal to or less than 0.1 mm.

As described above, as a reaction of the elastic displacement of the contact support portion 30 toward the outer side in the Y-axis direction (the direction orthogonal to the longitudinal direction of the first insulating member 11, that is, the lateral direction), the free-end portion 39 of the contact tab portion 33 is elastically displaced in the thickness direction (upward in the Z-axis direction) of the first insulating member 11. Since the displacement direction conversion structure uses a reaction of the elastic displacement of the contact support portion 30, there is almost no effect on the insertion-removal force during mating or non-mating, and a predetermined insertion-removal force can be ensured. For example, it is possible to obtain the amount of elastic displacement of the free-end portion 39 of the contact tab portion 33 that is approximately half the amount of elastic displacement of the contact support portion 30.

The contact support portions 30 may be provided so as to face each other inward of the first external side portion (peripheral edge portion) 16*b* that extends in the Y-axis direction (the direction orthogonal to the longitudinal direction of the insulating member, that is, the lateral direction). At least one of the contact support portions 30 is provided on one side of the first external side portion (peripheral edge portion) 16*b*, and at least one of the contact support portions 30 is provided on the other side so as to face the contact support portion 30 on one side. In other words, in the first external side portion (peripheral edge portion) 16*b*, at least one contact support portion 30 is provided to face at least one contact support portion 30.

The engaging portion 37 of the first external terminal 16 may have a concave shape, and the engaged portion of the second external terminal 26 may have a convex shape.

The present disclosure and the embodiments are summarized as described below.

The electrical connector 10 according to an aspect of the present disclosure includes: internal terminals 12 and 15, an insulating member 11 that holds the internal terminals 12 and 15; and an external terminal 16 that surrounds the internal terminals 12 and 15, in which the external terminal 16 includes peripheral edge portions 16*b* and 16*c* that cover a frame portion 13 of the insulating member 11, and a contact support portion 30 that is supported by the peripheral edge portions 16*b* and 16*c*, the contact support portion 30 includes a first tab portion 31 that is connected to the peripheral edge portions 16*b* and 16*c* and extends in a direction away from the frame portion 13, a bridge portion 32 that is connected to the first tab portion 31 and extends in a direction that differs from the direction in which the first tab portion 31 extends, and a second tab portion 33 that is connected to the bridge portion 32 and extends toward the frame portion 13, and an end portion of the second tab portion 33 that extends toward the frame portion 13 is a free-end portion.

In the structure described above, since the free-end portion 39 of the second tab portion 33 is elastically displaced in the thickness direction of the insulating member 11 as a reaction of an elastic displacement of the first tab portion 31, electrical contact (that is, electrical contact of the counterpart electrical connector 20 with the external terminal 26) in the thickness direction of the insulating member 11 is possible, and accordingly, unnecessary radiation noise can be effectively suppressed.

In addition, in the electrical connector 10 according to an embodiment, the contact support portion 30 has the first tab portions 31 and 31 on one side in a length direction of the insulating member 11 and has the first tab portions 31 on another side in the length direction of the insulating member, the bridge portion 32 is connected to the first tab portion 31 on the one side and the first tab portion 31 on the other side, and the second tab portion 33 is located between the first tab portion 31 on the one side and the first tab portion 31 on the other side.

Since the contact support portion 30 is supported by the two first tab portions 31 and 31 in the embodiment described above, the rigidity of cantilever elastic support can be increased.

In addition, in the electrical connector 10 according to an embodiment, the contact support portion 30 has the second tab portion 33 and 33 on one side in a length direction of the insulating member 11 and has the second tab portion 33 on another side in the length direction of the insulating member 11, the bridge portion 32 is connected to the second tab 33 portion on the one side and the second tab portion 33 on the other side, and the first tab portion 31 is located between the second tab portion 33 on the one side and the second tab portion 33 on the other side.

Since the two second tab portions 33 and 33 are in contact with the second external mounting portion 26*a* in the embodiment described above, electrical contact with greater certainty is provided.

In addition, in the electrical connector 10 according to an embodiment, the bridge portion 32 has a convex or concave engaging portion 37.

In the embodiment described above, mating can be performed with certainty without affecting the internal terminals 12 and 15.

In addition, in the electrical connector 10 according to an embodiment, the second tab portion 33 has a bent or curved shape.

In the embodiment described above, the free-end portion 39 of the second tab portion 33 is elastically displaced in the thickness direction of the insulating member 11.

In the electrical connector 10 according to an embodiment, the free-end portion 39 of the second tab portion 33 has a contact portion 34, and a surface of the contact portion 34 is flush with a peripheral edge surface 18 of the peripheral edge portions 16*b* and 16*c*.

In the embodiment described above, it is possible to suppress the end of the free-end portion 39 from being caught in (interfering with) the peripheral edge surface 18 of the peripheral edge portions 16*b* and 16*c*.

In addition, in the electrical connector 10 according to an embodiment, the first tab portion 31 and the second tab portion 33 are separated from each other by a notch 35.

In the embodiment described above, it is possible to easily achieve a displacement direction conversion structure for converting the displacement in the direction (the lateral direction or the Y-axis direction) orthogonal to the longitudinal direction of the insulating member 11 into the displacement in the thickness direction (the Z-axis direction) of the insulating member 11.

In addition, in the electrical connector 10 according to an embodiment, a plurality of contact support portions 30 are provided at positions facing each other, the contact support portion 30 being one of the plurality of contact support portions 30.

In the embodiment described above, the plurality of contact support portions 30 provide an electrical connection with greater certainty.

An electrical connector set 1 according to an aspect of the present disclosure includes: the electrical connector 10 described above; and a counterpart electrical connector 20 that detachably mates with the electrical connector 10 in the thickness direction of the insulating member 11, in which the free-end portion 39 of the second tab 33 is in contact with an external terminal 26 of the counterpart electrical connector 20.

In the structure described above, since the free-end portion 39 of the second tab portion 33 is elastically displaced in the thickness direction of the insulating member 11 as a reaction of an elastic displacement of the first tab portion 31 and the free-end portion 39 comes into contact with the external terminal 26 of the counterpart electrical connector 20, unnecessary radiation noise can be effectively suppressed.

What is claimed is:

1. An electrical connector comprising:
an internal terminal;
an insulating member that holds the internal terminal; and
an external terminal that surrounds the internal terminal, wherein
the external terminal includes a peripheral edge portion that covers a frame portion of the insulating member, and a contact support portion that is supported by the peripheral edge portion,
the contact support portion includes a first tab portion that is connected to the peripheral edge portion and extends in a direction away from the frame portion, a bridge portion that is connected to the first tab portion and extends in a direction that differs from the direction in which the first tab portion extends, and a second tab portion that is connected to the bridge portion and extends toward the frame portion and the peripheral edge portion of the external terminal, and
an end portion of the second tab portion that extends toward the frame portion and is proximal to the peripheral edge portion of the external terminal is a free-end portion.

2. The electrical connector according to claim 1, wherein
the contact support portion has the first tab portion on one side in a length direction of the insulating member and has the first tab portion on an other side in the length direction of the insulating member,
the bridge portion is connected to the first tab portion on the one side and the first tab portion on the other side, and
the second tab portion is located between the first tab portion on the one side and the first tab portion on the other side.

3. The electrical connector according to claim 2, wherein the second tab portion has a bent or curved shape.

4. The electrical connector according to claim 2, wherein the first tab portion and the second tab portion are separated from each other by a notch.

5. The electrical connector according to claim 2, wherein a plurality of contact support portions are at positions facing each other, the contact support portion being one of the plurality of contact support portions.

6. The electrical connector according to claim 2, wherein the bridge portion has a convex or concave engaging portion.

7. An electrical connector set comprising:
the electrical connector according to claim 2; and
a counterpart electrical connector configured to detachably mate with the electrical connector in a thickness direction of the insulating member,
wherein the free-end portion of the second tab is configured to contact an external terminal of the counterpart electrical connector.

8. The electrical connector according to claim 1, wherein
the contact support portion has the second tab portion on one side in a length direction of the insulating member and has the second tab portion on an other side in the length direction of the insulating member,
the bridge portion is connected to the second tab portion on the one side and the second tab portion on the other side, and
the first tab portion is between the second tab portion on the one side and the second tab portion on the other side.

9. The electrical connector according to claim 8, wherein the second tab portion has a bent or curved shape.

10. The electrical connector according to claim 8, wherein the first tab portion and the second tab portion are separated from each other by a notch.

11. The electrical connector according to claim 8, wherein a plurality of contact support portions are at positions facing each other, the contact support portion being one of the plurality of contact support portions.

12. The electrical connector according to claim 8, wherein the bridge portion has a convex or concave engaging portion.

13. The electrical connector according to claim 1, wherein the second tab portion has a bent or curved shape.

14. The electrical connector according to claim 1, wherein the free-end portion of the second tab portion has a contact portion, and a surface of the contact portion is flush with a peripheral edge surface of the peripheral edge portion.

15. The electrical connector according to claim 1, wherein the first tab portion and the second tab portion are separated from each other by a notch.

16. The electrical connector according to claim 1, wherein a plurality of contact support portions are at positions facing each other, the contact support portion being one of the plurality of contact support portions.

17. The electrical connector according to claim 1, wherein the bridge portion has a convex or concave engaging portion.

18. An electrical connector set comprising:
the electrical connector according to claim 1; and
a counterpart electrical connector configured to detachably mate with the electrical connector in a thickness direction of the insulating member,
wherein the free-end portion of the second tab is configured to contact an external terminal of the counterpart electrical connector.

19. An electrical connector comprising:

an internal terminal;

an insulating member that holds the internal terminal; and an external terminal that surrounds the internal terminal; wherein the external terminal includes a peripheral edge portion that covers a frame portion of the insulating member, and a contact support portion that is supported by the peripheral edge portion, the contact support portion includes a first tab portion that is connected to the peripheral edge portion and extends in a direction away from the frame portion, a bridge portion that is connected to the first tab portion and extends in a direction that differs from the direction in which the first tab portion extends, and a second tab portion that is connected to the bridge portion and extends toward the frame portion, an end portion of the second tab portion that extends toward the frame portion is a free-end portion, the contact support portion has the first tab portion on one side in a length direction of the insulating member and has the first tab portion on an other side in the length direction of the insulating member, the bridge portion is connected to the first tab portion on the one side and the first tab portion on the other side, the second tab portion is located between the first tab portion on the one side and the first tab portion on the other side, and the free-end portion of the second tab portion has a contact portion, and a surface of the contact portion is flush with a peripheral edge surface of the peripheral edge portion.

20. An electrical connector comprising:

an internal terminal;

an insulating member that holds the internal terminal; and an external terminal that surrounds the internal terminal; wherein the external terminal includes a peripheral edge portion that covers a frame portion of the insulating member, and a contact support portion that is supported by the peripheral edge portion, the contact support portion includes a first tab portion that is connected to the peripheral edge portion and extends in a direction away from the frame portion, a bridge portion that is connected to the first tab portion and extends in a direction that differs from the direction in which the first tab portion extends, and a second tab portion that is connected to the bridge portion and extends toward the frame portion, an end portion of the second tab portion that extends toward the frame portion is a free-end portion, the contact support portion has the second tab portion on one side in a length direction of the insulating member and has the second tab portion on an other side in the length direction of the insulating member, the bridge portion is connected to the second tab portion on the one side and the second tab portion on the other side, the first tab portion is between the second tab portion on the one side and the second tab portion on the other side, and the free-end portion of the second tab portion has a contact portion, and a surface of the contact portion is flush with a peripheral edge surface of the peripheral edge portion.

* * * * *